March 16, 1948. M. E. CHANDLER Re. 22,984
CONTROL APPARATUS
Original Filed Jan. 25, 1944
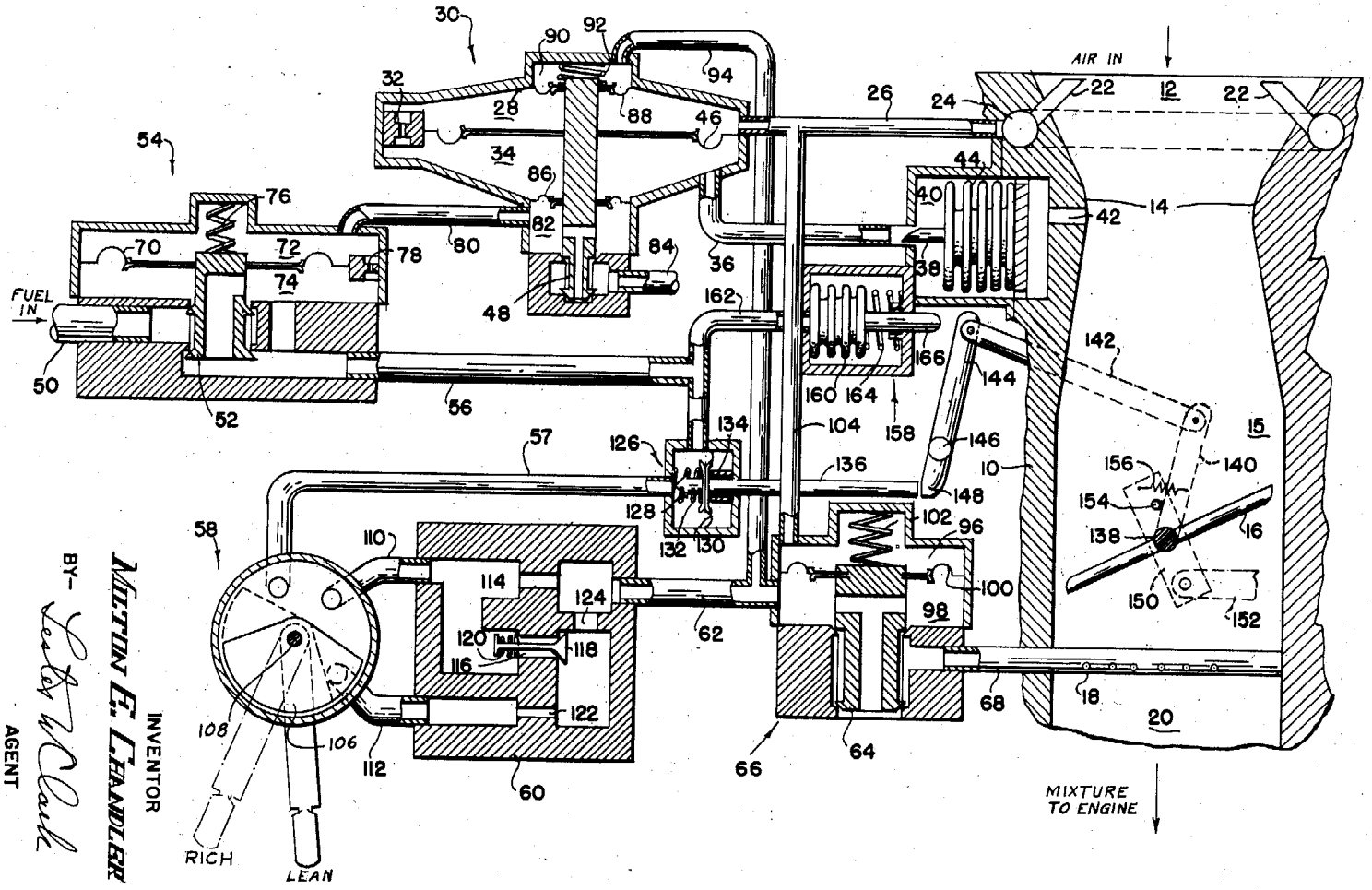
INVENTOR
MILTON E. CHANDLER
BY- Lester W. Clark
AGENT Reissued Mar. 16, 1948 Re. 22,984

UNITED STATES PATENT OFFICE 22,984

CONTROL APPARATUS

Milton E. Chandler, New Britain, Conn., assignor, by mesne assignments, to Niles-Bement-Pond Company, West Hartford, Conn., a corporation of New Jersey Original No. 2,394,664, dated February 12, 1946, Serial No. 519,611, January 25, 1944. Application for reissue October 1, 1946, Serial No. 700,359

14 Claims. (Cl. 261—50)

The present invention relates to control apparatus for internal combustion engines, and particularly to a safety control apparatus for the throttle of such an engine. In internal combustion engines, such as those used on aircraft, it is sometimes desired to limit the maximum power output of the engine in order to prevent the operator from running the engine under overload conditions. In engines such as aircraft engines, where the throttle is located at some distance from the pilot's control lever and is connected to that lever by a rather complicated linkage, it is also desired to provide some means to limit the minimum power output of the engine upon failure of the control linkage.

It is therefore an object of the present invention to provide improved means for limiting the movement of the throttle of an internal combustion engine.

Another object is to provide means for limiting the opening movement of the throttle of an internal combustion engine so as to provide a substantially constant maximum air flow to the engine.

Another object is to provide improved means for controlling the throttle of an internal combustion engine so as to secure a substantially constant flow of air to the engine.

Another object is to provide improved means responsive to the position of the throttle for controlling the fuel flow under idling conditions.

A further object is to provide improved means for preventing closure of the throttle beyond a partially open position in the event that the manual control linkage fails.

A still further object is to provide an arrangement of the type described in which the idling control mechanism serves to operate the throttle to a partially open position upon failure of the manual control linkage.

Other objects and advantages of the present invention will become apparent from a consideration of the appended specification, claims and drawing, in which the single figure represents a carburetor for an internal combustion engine provided with control apparatus embodying the principles of my invention.

Referring to the drawing, there is shown a body 10 of a carburetor for an internal combustion engine of a type used on aircraft. Air enters the carburetor body 10 at an inlet 12 and flows thru a Venturi restriction 14 and a passage 15, past a throttle 16 and a fuel discharge nozzle 18 to an outlet 20. A supercharger may be provided between the outlet 20 and the intake manifold of the engine. In certain cases the supercharger may be upstream from the inlet 12, or two superchargers may be used, one in each place.

The Venturi restriction 14 produces a pressure differential between the inlet 12 and the throat of the restriction which varies in accordance with the square of the velocity of the air passing thru the restriction. Since the cross-section of the venturi is constant, this pressure differential may be taken as a measure of the volume of air flowing thru the passage.

In order to control combustion conditions within the engine, it is necessary to control the fuel flow in proportion to the air flow. The fuel flow is controlled in accordance with the mass of air flowing, rather than its volume, because the density of the air varies in accordance with its pressure and temperature, which are in turn affected by external atmospheric conditions and by the altitude at which the aircraft is flying.

As previously stated, the pressure differential between the entrance 12 and the throat of venturi 14 varies as a function of the volume of air flowing thru the venturi. In order to obtain a pressure differential varying as a function of the mass of air flowing thru the venturi 14, the pressure differential between entrance 12 and the throat of venturi 14 is utilized to create an air flow thru a secondary air passage extending from entrance 12 to the throat of venturi 14. A plurality of impact tubes 22 are provided, whose open ends project into the entrance 12 to receive the impact of the entering air. The secondary air passage may be traced from entrance 12, thru tubes 22, a passage or vent ring 24 interconnecting the impact tubes, a conduit 26, a chamber 28 in a pressure meter generally indicated at 30, a restriction 32, a chamber 34 in the pressure meter 30, a conduit 36, past a valve 38 into a chamber 40, and thence thru a conduit 42 to the throat of venturi 14.

The valve 38 is controlled by a sealed bellows 44 mounted in the chamber 40. The bellows 44 is fixed at one end, so that the position of the free end, to which valve 38 is attached, varies in accordance with the air pressure in the chamber 40. The bellows 44 is preferably filled with nitrogen or some other suitable temperature responsive fluid, so that the position of valve 38 varies not only with the pressure but with the temperature of the air in the chamber 40, and hence with the density of that air.

In the secondary air passage, the pressure differential between the entrance 12 and the throat of venturi 14 is divided into two component pressure drops, one across the restriction 32 and the other across the valve 38. The valve 38 is positioned in accordance with the density of the air flowing thru the passage 15. Valve 38 is moved toward open position as the air density increases and toward closed position as to the air density decreases. If the volume of air flowing thru passage 15 remains constant and the air density decreases, then the mass of air supplied to the engine decreases. The movement of valve 38 toward closed position, which results from the decrease in air density, causes the pressure drop across valve 38 to increase, and the pressure drop across restriction 32 to decrease. By proper design of valve 38, the pressure drop across restriction 32 may be made to vary substantially in accordance with the mass of air flowing thru passage 15. This pressure differential across restriction 32 acts on a diaphragm 46 which separates the chambers 28 and 34. The force applied to diaphragm 46 is transmitted to a valve 48, on which it acts in a closing direction.

The fuel enters the carburetor from a fuel pump or other source of fuel under superatmospheric pressure thru a conduit 50 and flows thru a valve 52 in a pressure regulator generally indicated at 54, a conduit 56, an idle control 126, a conduit 57, a mixture control generally indicated at 58, a jet system 60, a conduit 62, a valve 64 in a second pressure regulator 66, and a conduit 68 to the fuel discharge nozzle 18.

The pressure regulator 54 includes a diaphragm 70 separating a pair of expansible chambers 72 and 74 and connected at its center to the valve 52. A spring 76 biases the valve 52 toward open position. A restriction 78 connects the chambers 72 and 74.

A portion of the fuel entering pressure regulator 54 flows thru chamber 74, restriction 78, chamber 72, a conduit 80, a chamber 82 in the pressure meter 30, past the valve 48, and thru a conduit 84 to a suitable drain, which may, for example, empty into the main air passage 15. If desired, the drain may be connected to the main fuel tank, or the fuel flowing thru it may be otherwise disposed of.

The pressure meter 30 includes a diaphragm 86 separating the chambers 34 and 82 and a diaphragm 88 separating the chamber 28 from a fourth expansible chamber 90. The valve 48 is biased toward closed position by a spring 92.

The chamber 90 is connected thru a conduit 94 to the fuel conduit 62 downstream from the jet system 60. The pressure in chamber 90 is therefore the same as that in the fuel line downstream from the jet system. The pressure in chamber 82 is the same as that in chamber 72 of pressure regulator 54. The pressure in chamber 72 differs from the pressure in chamber 74 by a fixed amount which depends on the strength of spring 76. Therefore the pressure in chamber 72 is a measure of the pressure on the upstream side of the jet system 60. For any given constant cross-sectional area of the fuel passage thru the jet system 60, the pressure differential across it is a measure of the fuel flow thru it. This pressure differential, or rather a smaller pressure differential which is a measure of the pressure differential across the jet system, is applied thru the diaphragms 86 and 88 of pressure meter 30 to the valve 48, on which it acts in an opening direction.

From the foregoing, it may be seen that the valve 48 is positioned in accordance with the balance between two forces, one of which varies in accordance with the mass of air entering the carburetor, and the other in accordance with the mass of fuel entering the carburetor. Furthermore, the valve 48 controls the mass of fuel entering the carburetor, since it controls the pressure in chamber 82. The pressure in the chamber 82 is transmitted to chamber 72 of pressure regulator 54 where it controls the position of valve 52 and hence the pressure on the upstream side of the jet system 60. The pressure on the upstream side of jet system 60 is therefore varied as a function of the mass of air flowing to the engine for combustion purposes.

The pressure regulator 66 operates to maintain a substantially constant pressure on the downstream side of the jet system 60 and thereby to prevent variations in pressure at the fuel discharge nozzle 18, which may be due to operation of the throttle or to variations in engine speed, from reaching the downstream side of the jet system and affecting the fuel flow.

Since the pressure on the downstream side of the jet system 60 is held constant and the pressure on the upstream side is varied as a function of the air flow, it may be seen that for a given constant cross-sectional area of the jet system, the fuel flow is proportioned to the air flow. The mixture control 58 may be operated to vary the cross-sectional area of the jet system and hence to vary the fuel to air ratio.

The pressure regulator 66 includes a pair of expansible chambers 96 and 98 separated by a flexible diaphragm 100, which is attached at its center to the valve 64. A spring 102 biases the valve 64 toward closed position. The chamber 96 is connected thru a conduit 104 to the conduit 26 and thence thru the vent ring 24 and impact tubes 22 to the air entrance 12. The chamber 98 is connected to the fuel conduit 62.

The mixture control 58 includes a disc valve 106 fixed on a shaft 108. The disc valve 106 controls the flow of fuel thru ports opening into conduits 110 and 112 which lead into the jet system 60. When the disc 106 is in the position illustrated in full lines in the drawing, fuel can flow to the jet system only thru the conduit 110. This full line position of the disc valve 106 is known as the "lean" position of the mixture control 58. When the disc valve 106 is in the dotted line position shown in the drawing, the fuel can flow thru both the conduits 110 and 112. The dotted line position of disc valve 106 is termed the "rich" position of the mixture control.

The conduit 110 conducts fuel either thru a fixed restriction or jet 114, or thru a restriction 116 controlled by a valve 118 biased to closed position by a spring 120. The conduit 112 conducts fuel to a fixed restriction 122. Fuel flowing thru the restrictions 116 and 122 also flows thru another restriction 124 which determines the maximum flow thru restrictions 116 and 122.

The valve 118 opens only at high pressure differentials across the jet system to increase the fuel to air ratio under heavy load conditions.

The idle control 126 includes a valve 128 attached to the center of a diaphragm 130. A spring 132 biases the valve 128 in an opening direction. A stop 134 is provided to limit the opening movement of valve 128. An elongated stem 136 extends outwardly from the side of diaphragm 130 opposite the valve 128.

The throttle 16 is fixed on a shaft 138. An arm 140 is also fixed on shaft 138. The end of arm 140 is pivotally connected to a link 142 whose opposite end is pivotally attached to an arm 144 which rotates on a pivot 146. The opposite end 148 of arm 144 extends into the path of movement of valve stem 136.

A lever 150 is mounted to freely rotate on the throttle shaft 138. One end of the lever 150 is pivotally attached to a link 152 which may extend thru a linkage train (not shown) to the throttle control lever in the pilot's compartment. The opposite end of lever 150 carries a stop 154 which extends into the path of movement of arm 140. A spring 156 biases the arm 140 into engagement with the stop 154.

The opening movement of the throttle is limited by a stop mechanism generally indicated at 158. The stop mechanism 158 includes a bellows 160 whose interior is connected thru a conduit 162 to the fuel conduit 56. A compression spring 164 biases the free end of bellows 160 for movement to the left. A stop member 166 is attached to the free end of bellows 160, and the opposite end of stop member 166 extends into the path of movement of the upper end of arm 144.

In order to move the throttle toward open position, the pilot moves his control lever so as to move link 152 to the right. This causes a counterclockwise movement of lever 150. Since the arm 140 is held in engagement with stop 154 by spring 156, it follows the counterclockwise movement of lever 150. Since the arm 140 is fixed on the shaft 138, the latter is also rotated, thereby moving the throttle 16 in an opening direction.

This opening movement can continue under the control of the manually operated link 152 until the upper end of arm 144 engages the stop member 166. Thereafter, if the link 152 is moved further to the right, the arm 140 does not follow the lever 150, but the spring 156 is stretched and the stop 154 separates from the arm 140.

The position of the throttle at such a time is determined by the position of stop 166. The position of stop 166 in turn depends upon the pressure in conduit 56 and hence on the regulated pressure in chamber 74 of pressure regulator 54. As previously described, the pressure in chamber 74 varies as a function of the mass of air flowing to the engine thru the venturi 14.

Under these conditions, the throttle 16 is controlled to maintain a substantially constant air flow. If the air flowing to the engine should increase, there would be a resulting increase in the pressure in chamber 74. This increased pressure in chamber 74 is transmitted to bellows 160 where it acts thru the stop 166 to move the throttle 16 in a closing direction, thereby decreasing the air flow. Therefore the system tends to maintain a constant air flow. The value of this air flow may be adjusted by changing the tension of spring 164 and hence the position at which stop 166 is maintained for a given value of air flow. Although no means is illustrated for changing the tension of spring 164, such means are common and may readily be provided.

At low air flows, such as are encountered under idling conditions, the pressure differential set up by the venturi 14 tends to be erratic, and is not a reliable indication of the volume of air entering the engine. Provision is made to transfer control of the fuel flow to the throttle at such times. The spring 92 in the pressure meter 30 acts on valve 48 in a closing direction. When the differential pressure acting on diaphragm 46 is small, as under low air flow conditions, the spring 92 is the predominating force acting on valve 48. A closing movement of valve 48 causes an increase in the fluel flow thru the main fuel line, since the closure of valve 48 increases the pressure in chamber 82 of pressure meter 30 and hence in chamber 72 of pressure regulator 54. This causes an opening movement of valve 52 until a balancing increase is produced in the pressure in chamber 74, which is the same as the pressure on the upstream side of the jet system 60. Furthermore, the spring 76 of pressure regulator 54 biases valve 52 in an opening or fuel flow increasing direction.

As the throttle 16 approaches its idling position, the link 144 is rotated clockwise and its lower end 148 engages the end of valve stem 136 and operates the idle control 126 so as to move valve 128 in a closing direction. Under such conditions, the quantity of fuel supplied to the engine is determined by the throttle position as that position is reflected in the position of valve 128. This is in contrast to the operation of the system at higher air flows when the fuel supply is determined by the mass of air entering the engine as measured by pressure meter 30.

If the linkage connecting the link 152 with the pilot's control lever should fail, then the maximum opening position of the throttle would be limited by the stop mechanism 158 and the maximum closing position would be limited by valve stem 136. Therefore the engine would continue to operate and drive the aircraft, even though its speed of operation could not be predicted. This might be of considerable advantage to the occupants of the aircraft. For example, under combat conditions, it might enable the aircraft to return to its base even though the throttle control was not operative. The throttle could not move to its fully closed position and cut off the engine, nor could it move to its fully open position and cause the engine to become overheated.

While I have shown and described a preferred embodiment of my invention, it will be readily understood by those skilled in the art that other modifications may be made without departing from the scope of the invention as defined in the appended claims.

I claim as my invention:

1. Control apparatus for an internal combustion engine comprising throttle means for controlling the flow of air to said engine, manually movable means for positioning said throttle means, stop means for limiting the opening movement of said throttle means, spring means permitting additional movement of said member after said throttle means engages said stop means, a conduit for fuel flowing to said engine, means responsive to the quantity of air flowing to said engine for controlling a fuel pressure in said conduit, means responsive to said controlled pressure for positioning said stop means, valve means in said fuel conduit, means biasing said valve means toward open position, abutment means associated with said valve means and said throttle means and adapted to engage when said throttle means is adjacent its closed position to cause a following movement of said valve means, said biasing means being effective upon failure of said manually movable means to move said throttle means to a partially open position.

2. Control apparatus for an internal combustion engine, comprising a first conduit for air flowing to said engine for combustion purposes, throttle means for controlling the flow of air thru said conduit, a second conduit for fuel flowing to said engine, means responsive to the quantity of air flowing thru said first conduit and effective when said quantity exceeds a predetermined value to control a pressure in said fuel conduit, means effective when said quantity is less than said value to increase said pressure disproportionately to said quantity, valve means in said second conduit for controlling the fuel flow therethru, spring means biasing said valve means toward open position, means responsive to said pressure and acting on said valve means in an opening direction, and a member connected to said throttle means for movement therewith, said member being positioned adjacent said valve means and adapted to engage said valve means to cause a following movement thereof whenever said throttle means is in a position corresponding to a quantity of air less than said predetermined value.

3. Control apparatus for an internal combustion engine, comprising a first conduit for air flowing to said engine for combustion purposes, throttle means for controlling the flow of air thru said conduit, manually movable means for positioning said throttle means, a second conduit for fuel flowing to said engine, means responsive to the quantity of air flowing thru said first conduit and effective when said quantity exceeds a predetermined value to control the flow thru said fuel conduit, valve means in said second conduit for additionally controlling the fuel flow therethru, spring means biasing said valve means towards open position, means responsive to the pressure in said fuel conduit and acting on said valve means in an opening direction, and a member connected to said throttle means for movement therewith, said member being positioned adjacent said valve means and adapted to engage said valve means to cause a following movement thereof whenever said throttle means is in a position corresponding to a quantity of air less than said predetermined value, said spring means and said fuel conduit pressure being effective upon failure of said manually movable means to move said throttle means to a partially open position.

4. Control apparatus for an internal combustion engine, comprising throttle means for controlling the flow of air thru said conduit, manually movable means for positioning said throttle means, a second conduit for fuel flowing to said engine, valve means in said second conduit for controlling the fuel flow therethru, spring means biasing said valve means toward open position, and a member connected to said throttle means for movement therewith, said member being positioned adjacent said valve means and adapted to engage said valve means to cause a following movement thereof whenever said throttle means is in a position adjacent its closed position, said spring means being effective upon failure of said manually movable means to move said throttle means to a partially open position.

5. Control apparatus for an internal combustion engine is an aircraft, comprising throttle means for controlling the flow of air to said engine for combustion purposes, a manually movable control member remote from said throttle means, linkage connecting said member and said throttle means, a conduit for fuel flowing to said engine, valve means in said conduit for controlling the fuel flow therethru, spring means biasing said valve means toward open position, and a member connected to said throttle means for movement therewith, said member being positioned adjacent said valve means and adapted to engage said valve means to cause a following movement thereof whenever said throttle means is in a position adjacent its closed position, said spring means being effective upon failure of said linkage to move said throttle means to a partially open position.

6. Control apparatus for an internal combustion engine, comprising a throttle for controlling the flow of combustion air to said engine, means for positioning said throttle, a member connected to said throttle for concurrent movement therewith, an abutment for engaging said member to limit the free movement of said throttle toward closed position, resilient supporting means for said abutment so that said throttle may be moved beyond the limiting position established thereby, said abutment and said resilient supporting means being effective on failure of said throttle positioning means to move said throttle to a partially open position, a fuel conduit, and a valve in said conduit adapted to control the total flow of fuel to said engine; said resilient supporting means being effective upon continued movement of said positioning means in a throttle closing direction after engagement of said abutment by said member to operate said valve toward closed position.

7. Control apparatus for an internal combustion engine in an aircraft, comprising throttle means for controlling the flow of air to said engine for combustion purposes, a manually movable control member remote from said throttle means, linkage connecting said member and said throttle means, a conduit for fuel flowing to said engine, valve means in said conduit for controlling the total fuel flow to said engine, means biasing said valve means toward open position, and a member connected to said throttle means for movement therewith, said member being positioned adjacent said valve means and adapted to engage said valve means to cause a following movement thereof whenever said throttle means is in a position adjacent its closed position, said biasing means being effective upon failure of said linkage to move said throttle means to a partially open position.

8. Control apparatus for an internal combustion engine in an aircraft, comprising throttle means for controlling the flow of air to said engine for combustion purposes, a manually movable control member remote from said throttle means, linkage connecting said member and said throttle means, a conduit for fuel flowing to said engine, valve means in said conduit for controlling the fuel flow therethru, means for applying an opening force to said valve means including a diaphragm subject to fuel pressure in said fuel conduit, and a member connected to said throttle means for movement therewith, said member being positioned adjacent said valve means and adapted to engage said valve means to cause a following movement thereof whenever said throttle means is in a position adjacent its closed position, said force applying means being effective upon failure of said linkage to move said throttle means to a partially open position.

9. Control apparatus for an internal combustion engine in an aircraft, comprising throttle means for controlling the flow of air to said engine for combustion purposes, a manually movable control member, means operatively connecting said member and said throttle means, a conduit for fuel flowing to said engine, valve means in said conduit for controlling the total fuel flow to said engine, spring means biasing said valve means toward open position, and an abutment member connected to said manual control member for movement therewith, said abutment member being positioned adjacent said valve means and adapted to engage said valve means to cause a closing movement thereof whenever said manual control member is in a position adjacent its throttle closed position, said spring means being effective upon removal of actuating force on said manual control member to move said manual control member to a position corresponding to a partially open position of said throttle.

10. Control apparatus for an internal combustion engine, comprising a first conduit for combustion air flowing to said engine, a throttle for controlling the flow of air thru said conduit, means for positioning said throttle, a second conduit for fuel flowing to said engine, means for regulating the pressure in a portion of said fuel conduit to control the fuel flow therethru, a valve in said fuel conduit for additionally controlling the fuel flow therethru, means responsive to the fuel pressure in said conduit portion and acting on said valve in an opening direction, a member connected to said throttle for movement therewith, an abutment connected to said valve and positioned in the path of said member so that when said throttle approaches closed position, said member engages said abutment and moves said valve toward closed position against the action of said fuel pressure responsive means.

11. Control apparatus as in claim 10, in which said fuel pressure responsive means is effective upon failure of said throttle positioning means to move said throttle to a partially open position.

12. Control apparatus as in claim 11 in which said fuel pressure regulating means is responsive to the rate of flow of air thru said first conduit.

13. Control apparatus for an internal combustion engine, comprising a first conduit for combustion air flowing to said engine, a throttle for controlling the flow of air thru said conduit, means for positioning said throttle, a second conduit for fuel flowing to said engine, means for regulating the pressure in a portion of said fuel conduit to control the fuel flow therethru, a member connected to said throttle for movement therewith, an abutment positioned in the path of said member for limiting the free movement of said throttle in a closing direction, said abutment being movable between a first position corresponding to a partly open position of said throttle and a second position corresponding to the closed position of said throttle, and means including a diaphragm subject to the fuel pressure in said conduit portion for moving said abutment to said first position in response to said pressure, said abutment moving means being effective upon failure of said throttle positioning means to move said throttle to a partially open position.

14. Control apparatus for an internal combustion engine, comprising a throttle for controlling the flow of combustion air to said engine, means for positioning said throttle, a member connected to said throttle for concurrent movement therewith, an abutment for engaging said member to limit the free movement of said throttle toward closed position, resilient supporting means for said abutment so that said throttle may be moved beyond the limiting position established thereby, said abutment and said resilient supporting means being effective on failure of said throttle positioning means to move said throttle to a partially open position, a fuel conduit, a valve in said conduit for controlling the total fuel flow to said engine, and a stem for said valve movable concurrently with said abutment and effective upon continued movement of said member in a throttle closing direction after engagement with said abutment to move said valve toward closed position.

MILTON E. CHANDLER.

REFERENCES CITED

The following references are of record in the file of this patent:

UNITED STATES PATENTS

| Number | Name | Date |
|---|---|---|
| 2,002,483 | Kimball | May 21, 1935 |
| 2,009,109 | Hunt | July 23, 1935 |
| 2,155,560 | Malouf | Apr. 25, 1939 |
| 2,189,705 | Chandler | Feb. 6, 1940 |
| 2,205,458 | Ball | June 25, 1940 |
| 2,361,227 | Mock | Oct. 24, 1944 |

FOREIGN PATENTS

| Number | Country | Date |
|---|---|---|
| 452,246 | Great Britain | Aug. 19, 1936 |